Dec. 27, 1960 W. J. PHILLIPS 2,966,361
WORK HOLDING DEVICE
Filed May 29, 1958
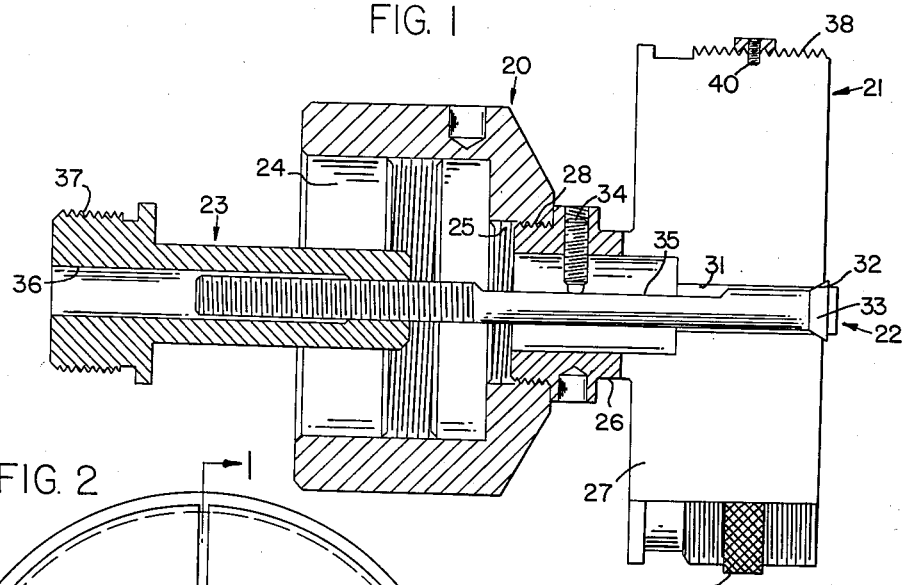
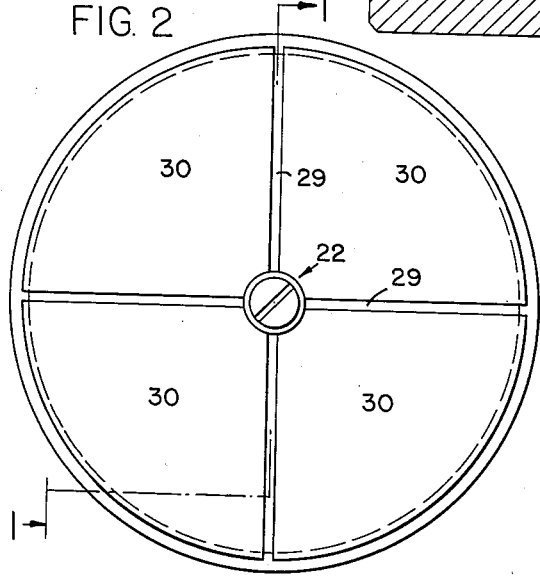
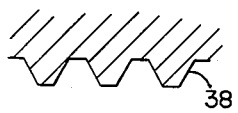
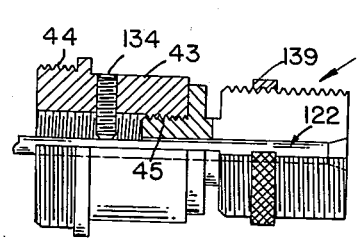
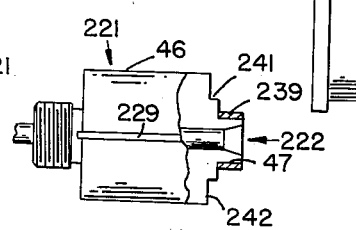
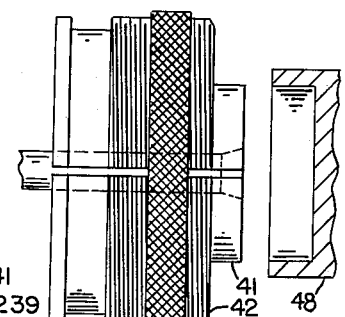
INVENTOR.
WILLIAM J. PHILLIPS
BY Cumpston + Shaw
HIS ATTORNEYS

United States Patent Office 2,966,361
Patented Dec. 27, 1960

2,966,361

WORK HOLDING DEVICE

William J. Phillips, Rochester, N.Y., assignor to Phillips Machines, Inc., Rochester, N.Y., a corporation of New York Filed May 29, 1958, Ser. No. 738,679

8 Claims. (Cl. 279—2)

This invention relates to work holding devices, and more particularly to the so-called internal gripping type which are adapted to engage the workpiece from within as along the walls of a bore or recess formed in the workpiece, one object of the invention being to provide a device of the above nature having a more practical and efficient construction.

Another object is to provide a device of the above character which is more accurate than devices heretofore known and which is provided with means for insuring that the work engaging surfaces are concentric with the axis of rotation of the device.

A further object is to provide a device having the above advantages which may be readily and economically manufactured and assembled by known methods and machines.

To these and other ends the invention resides in certain improvements and combinations of parts, all as will be hereinafter more fully described, the novel features being pointed out in the claims at the end of the specification.

In the drawings:

Fig. 1 is a side elevational view, partly in section substantially along line 1—1 of Fig. 2, showing a device embodying the present invention;

Fig. 2 is an end elevational view of the work engaging portion of the device as viewed from the right in Fig. 1;

Fig. 3 is an enlarged sectional view of the threads formed on the circumference of the work engaging portion;

Fig. 4 is a side elevational view of a smaller size device than that shown in Figs. 1–3 and shows the work engaging portion machined to fit a specific workpiece;

Fig. 5 is a side elevational view, partly in section, of a device of reduced size, and Fig. 6 is a side elevational view, partly in section, of the work engaging portion showing a slightly modified construction, The preferred embodiment of the present invention preferably comprises a fixed member or spindle collar shown generally at 20 (Fig. 1), an expandable member or split collet 21, a draw bolt 22 and a threaded member or draw collet 23 which engages draw bolt 22 for causing member 21 to spread and grip the workpiece, as hereinafter more fully described.

Fixed member 20 is preferably provided with an axially extending bore 24, the leftend of which is threaded for attachment to the spindle of a conventional metal-working lathe. The right end of bore 24 is of smaller diameter and is formed with threads 25 by means of which expandable member 21 is attached to fixed member 20.

Although expandable member 21 is preferably a unitary member it may be thought of as comprising a mounting portion 26 and a work engaging portion 27. Mounting portion 26 is externally threaded, as at 28, for engagement with threads 25 on fixed member 20 whereby the expandable member is securely attached to fixed member 20. Work engaging portion 27 is preferably formed with intersecting slots 29 (Fig. 2) which divide portion 27 into a plurality of segments 30 (Fig. 2) which are capable of limited radial movement relative to one another. Since mounting portion 26 and work engaging portion 27 of member 21 are integral it will be seen that segments 30 are connected together in the area of portion 26 and, although they may move relative to one another, the movement is limited to a few thousandths of an inch.

Member 21 is formed with an axially extending bore 31 through which draw bolt 22 extends, as shown in Fig. 1. The outer or right end of bore 31 is preferably formed with a conical or flared recess, as at 32. Bolt 22 acts as a wedge and is formed with a tapered head portion 33 for engagement with conical portion 32. A set screw 34 engages a flattened portion 35 of bolt 22 for preventing rotation of the same.

Bolt 22 is threaded at its inner or left end and engages threaded member 23. Member 23 has a longitudinally extending bore 36 through which bolt 22 may extend. Member 23 is externally threaded adjacent its left end, as at 37, for engagement with suitable means such as a draw bar on the lathe whereby member 23 may be rotated in situ or moved axially for moving bolt 22 axially to the left, as viewed in Fig. 1, for expanding segments 30, or to the right for allowing segments 30 to contract.

Segments 30 are preferably formed with external threads 38 as shown in Fig. 1. Threads 38 are preferably of the stub type, as shown in Fig. 3 and extend from the free or right hand end of the segments substantially for the full length thereof for a purpose hereinafter described. A threaded ring 39 engages threads 38 and may be rotated to the desired position on segments 30. Ring 39 is provided with a set screw 40, the inner end of which is reduced in diameter so as to engage one of slots 29 for releasably holding ring 39 in its adjusted position on member 21.

In use, draw bolt 22 is tightened causing segments 30 to move outwardly relative to one another until their outward movement is limited by ring 39. At this point draw bolt 22 may be further tightened to insure that the segments are in their fully expanded positions and then the right hand or free portions of segments 30 are turned or machined to a diameter slightly greater than the internal diameter of the workpiece, as for example 0.002 inch oversize. This diameter is indicated at 41 in Fig. 4. The machining of diameter 41 also produces a work locating stop 42 (Fig. 4) against which the end of the work is butted. After segments 30 are turned to the desired diameter, draw bolt 22 is loosened and the segments are allowed to collapse or return to their normal positions, at which point diameter 41 is slightly smaller than the diameter of a workpiece 48 (Fig. 4), as for example 0.005 inch undersize. Thereafter workpiece 48 is positioned on the device and draw bolt 22 again tightened causing segments 30 to move outwardly into gripping engagement with the workpiece.

Of course, if in a subsequent operation it is desired to hold a workpiece having a slightly smaller diameter than the previous workpiece it is only necessary to repeat the above operation turning segments 30 down to the proper diameter for the subsequent workpiece. In addition, the axial depth of the gripping surfaces of segments 30 may be varied to best suit the particular application. That is, it will be readily appreciated that segments 30 may be cut away in an axial direction to whatever depth is necessary within the limits of the expandable member. While I have shown work locating stop 42 as being approximately ¼ inch from the extreme right end of segments 30, stop 42 could be moved to the left to increase the axial length of that portion of the segments which grips the workpiece. All that is necessary to accomplish the above is to loosen set screw 40 and rotate ring 39 until it is moved to the left, as viewed in Figs. 1 and 4, through a sufficient distance to allow shoulder 42 to be located in the desired position.

Thus, it will be seen that ring 39 provides an adjustable limit to the outward or radial movement of the gripping sections, and as a result, segments 30 may be moved outwardly under the action of draw bolt 22 prior to their being machined to the desired diameter. I have found that with my device the segments may be forced outwardly against ring 39 with approximately the same pressure as that which is required to hold the workpiece. Segments 30 may be turned to the desired diameter with the assurance that when the draw bolt 22 is loosened, the workpiece inserted and draw bolt 22 retightened, segments 30 will move outwardly and the work engaging surfaces thereof will be as concentric with the axis of rotation as they were when machined. Draw bolt 22 may be repeatedly loosened and retightened, and each time each of the various segments will move outwardly through the same distance so that subsequent workpieces will be held in precisely the same position. Thus, my construction produces a work engaging device in which the gripping surfaces may be machined concentric with the axis of rotation and which upon subsequent contraction and expansion will remain in the desired concentric relationship.

My construction has the further advantage that it minimizes the effect of dirt or chips upon the head of draw bolt 22. That is, the outward expansion of segments 30 is restricted by ring 39 so that approximately the same force is required to move the segments out against the ring as is required to move the segments into engagement with the workpiece. This pressure is of considerable magnitude and, as a result, any dirt or other particles between the head of bolt 22 and conical seat 32 are crushed or minimized. Since the outward forces are approximately equal during the machining and work gripping operations, the effect of any chips or other imperfections are neutralized. All of these factors result in increased accuracy and a uniformly high degree of concentricity.

Not only does ring 39 produce the above advantages, but it has a further advantage in that it acts as a safety stop limiting the outward radial movement of segments 30. That is, I have found that if expandable member 21 is five inches or greater in diameter, the centrifugal force resulting from accidental high speed rotation of the device may either cause one or more of the segments to move outwardly beyond their elastic limit or to actually separate and fly-off. This latter procedure is, of course, dangerous and the increase in safety is an important aspect of my device.

While devices have heretofore been constructed similar to my device described above, with the omission of retaining ring 39, these prior devices have not been satisfactory and have not been widely used because of the very lack of ring 39 or means similar thereto. Specifically, in the prior devices the expanding segments were machined in their collapsed positions and thereafter expanded into engagement with the workpiece. However, since one or more of the segments often requires greater force than the other segments to move outwardly through an equal distance, the prior devices did not have the high degree of concentricity required for precision work. Moreover, if there were any chips or other foreign matter caught between the head of the draw bolt and the tapered seat, the outward radial movement of the segments would be erratic and non-uniform. Similarly, if the draw bolt were tightened so as to move the segments outwardly prior to machining there were the same problems because without positive means to limit the outward movement of the segments, the draw bolt could not be tightened to the desired degree and the device was subject to the shortcomings described above. Of course, without the provision of means similar to ring 39 the prior art devices had no means for preventing the collet from flying apart or from having one or more of the segments being moved so far outwardly as to take a permanent set or deformation.

Thus, it will be seen that my invention provides a marked improvement over the prior art and provides a novel and improved gripping device which is highly accurate, which will maintain the desired concentricity of the gripping surfaces, despite repeated expansion and contraction movements, and which may be readily and economically manufactured and assembled without special tools or machines.

In Fig. 5, I have shown a slightly modified construction wherein the parts are indicated by reference characters which are 100 units higher than the reference characters indicating the same or similar parts in the construction shown in Figs. 1–4. In Fig. 5, expandable member 121 is of much smaller diameter than member 21 shown in Fig. 1 and is adapted for use with smaller workpieces. In order to mount expandable member 121 on spindle collar 20 it is necessary to provide an adapter member 43 which is provided with external threads 44 for engagement with threads 25 on spindle collar 20 and which is provided with internal threads 45 for engagement with similar threads on the left end of expandable member 121. A set screw 134 extends through adapter 43 into engagement with a flattened portion of draw bolt 122 for holding the same against rotation. Expandable member or collet 121 is similar to member 21 so that further discussion is believed unnecessary.

In Fig. 6, I show a slightly modified construction of the expandable member. Although I have shown this construction as applied to one of the smaller sizes it will be understood that this construction may be used on an expandable member of any desired diameter. The elements of my modified construction are indicated by reference characters which are 200 units higher than the reference characters indicating the same or similar parts in the construction shown in Figs. 1–4. In my modified construction the threads along the circumference of expandable member 221 are omitted and the segments held against excessive outward radial movement by means of a ring 239 which may either fit along the major diameter of member 221, as at 46, or along a minor diameter thereof as at 47. In either event, it will be seen that ring 239 limits the outward movement of the segments and provides means whereby the segments may be forced outwardly under approximately the same pressure as will be exerted during the gripping operation. Thus, the operation of expandable member 221 is similar to that described above in regard to members 121 and 21.

Thus, it is submitted that my invention accomplishes its stated objects and provides an improved and highly accurate device for internally gripping a workpiece. Since the expanding segments move outwardly in a uniform manner during succeeding expansion movements my device maintains its high accuracy through repeated use. In addition, my device is safer than devices heretofore known for there is a positive limit to the outward radial movement of the expanding segments and the segments are prevented from breaking off during high speed rotation of the device.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A device for positioning and internally gripping a workpiece, said device comprising an expandable member having an axial bore extending therethrough, said member being formed with intersecting radial slots for dividing said member into a plurality of segments, each of said segments being movable radially relative to the remaining segments; means for mounting said expandable member on a support; wedge means extending through said bore in said expandable member; means engaging said wedge means for moving said wedge means into engagement with the walls of said bore in said expandable member for moving said segments radially outwardly; and means circumferentially engaging said segments for limiting the radial movement and preventing distortion thereof while insuring equal radial movement by each of said segments.

2. A device as set forth in claim 1 in which said bore is formed with a conical portion adjacent the outer end thereof and said wedge means comprises a bolt having a tapered head portion adapted to engage said conical portion of said bore for moving said segments radially outwardly.

3. A device as set forth in claim 1 in which said segments have thread means formed on the outer radial surfaces thereof and said circumferential engaging means is formed with thread means engaging said thread means on said segments.

4. A device as set forth in claim 1 in which said segments have thread means formed on the outer radial surfaces thereof; said circumferential engaging means being formed with thread means for engagement with said thread means on said segments; and releasable means on said circumferential means contacting said expandable member for holding said circumferential means in position on said expandable member.

5. A device for positioning and internally gripping a workpiece, said device comprising a fixed member having an axial bore therethrough; an expandable member having an axial bore extending therethrough, said expandable member being formed with intersecting radial slots extending therethrough for dividing said member into a plurality of segments, each of said segments being movable radially relative to the remaining segments; means for mounting said expandable member on said fixed member with said bores in alignment; bolt means extending through said bore in said expandable member; means engaging said bolt means for moving said bolt means axially along said bores, a portion of said bolt means engaging the walls of said bore in said expandable member for moving said segments radially outwardly; and means circumferentially engaging said segments for limiting the radial movement and preventing distortion thereof while insuring equal radial movement by each of said segments.

6. A device as set forth in claim 5 in which said bore in said expandable member is formed with a conical portion adjacent the outer end thereof and said bolt means has a tapered head portion adapted to engage said conical portion of said bore for moving said segments radially outwardly.

7. A device as set forth in claim 5 in which said segments have thread means formed on the outer radial surfaces thereof and said circumferential engaging means is formed with thread means engaging said thread means on said segments.

8. A device as set forth in claim 5 in which said segments have thread means formed on the outer radial surfaces thereof; said circumferential engaging means being formed with thread means for engagement with said thread means on said segments; and releasable means on said circumferential means contacting said expandable member for holding said circumferential means in position on said expandable member.

References Cited in the file of this patent

UNITED STATES PATENTS

| | | |
|---|---|---|
| 1,191,755 | Andrews | July 18, 1916 |
| 1,427,155 | Haven | Aug. 29, 1922 |
| 1,854,825 | Connell | Apr. 19, 1932 |
| 2,105,618 | Silva | Jan. 18, 1938 |
| 2,829,897 | Parker et al. | Apr. 8, 1958 |